United States Patent Office 2,701,754
Patented Feb. 8, 1955

2,701,754

MOTOR FUEL

Joseph P. Haworth, Westfield, N. J., Fredrick Lowell Jonach, New York, N. Y., and John E. Hickok, Berkeley Heights, and Alfred H. Matuszak, Westfield, N. J., assignors to Standard Oil Development Company, a corporation of Delaware No Drawing. Application August 23, 1951,
Serial No. 243,368

12 Claims. (Cl. 44—77)

The present invention relates to a motor fuel composition adapted to provide distinctly improved engine operation in automotive vehicles, motor-boats and aircraft in cool, moist, atmospheric conditions. The motor fuel composition of the present invention comprises a hydrocarbon mixture having suitable volatility, as in gasoline, for normal engine operation, and containing as an ingredient, a very small but critical percentage of an aliphatic, oxygen-containing compound or mixture of such compounds of a particular type. In addition, the fuel compositions of the present invention may contain oiliness agents, gum solvents and other additives such as alkyllead antidetonants, lead-scavenging halides, dyes, gum inhibitors, antioxidants, rust-preventives, metal-deactivators and the like.

The aliphatic, oxygen-containing compounds in the fuel compositions of the present invention are bifunctional, contain between 6 and 21 carbon atoms in their molecules and have at least one carbon atom or one oxyalkylene group separating the two carbon atoms to which the functional groups are attached. The functional groups are normally hydroxyl radicals attached directly to carbon atoms in the longest aliphatic chain, but it is to be understood that at least one of the functional groups may be a methylol radical. Furthermore, one of two hydroxyl radicals may undergo ketoenol tautomerism when the carbon atom to which it is attached is unsaturated. An example of keto-enol tautomerism is the equilibrium between 2-methyl-3-pentene-diol-2, 4 and 2-methyl-2-hydroxy-pentanone-4. Preferred compounds for use in the fuel compositions of the present invention are aliphatic diols, either saturated or unsaturated, and characterized by having a methyl radical directly attached to at least one of the carbon atoms to which a hydroxyl group is attached. In a more preferred modification of the present invention, at least one of the hydroxyl radicals is attached to a tertiary carbon atom in the molecule of an aliphatic diol.

The novel fuel compositions of this invention are primarily intended to overcome certain operational difficulties in connection with automotive, marine, stationary, and airplane engines. The difficulties referred to result in frequent stalling of the engine when idling conditions in which the engine is used are such as occur with a relatively high humidity, and a temperature below about 60° F. in the circumambient atmosphere.

While this problem has actually existed for many years, its nature has not been generally understood. Attention has recently been focused on it due to numerous complaints of car owners, particularly in the northern portion of the United States. These owners reported that during cool, wet weather their cars gave poor idling performance characterized by a high number of engine stalls. The difficulty was encountered in all types of cars, irrespective of types of carburetors or of commercial brands of gasoline used.

In order to indicate the magnitude of this difficulty, reference may be made to a survey conducted in the New Jersey area based on the experiences of 300 car owners driving twenty different car models, during the fall and winter period. These cars employed the winter grade of regular and premium commercial gasolines. Table I gives a summary of the results obtained, showing the substantial number of stalls encountered in the operation of the cars under the indicated conditions.

The bare statistics of Table I coupled with the common experience of all automotive users serve to indicate the magnitude of the problem of engine stalling encountered under cool, humid temperature conditions. However, it is significant to note that this problem has of late become of increased importance due to certain specific factors. First, most post-war cars are not provided with a manual throttle control; so that car owners are no longer able at will to maintain a high idling speed during the warm-up period to prevent stalling. Second, the idle speed of cars with automatic transmissions is rather critical during a warm-up and the fastest idle which may be used must not be too fast, increasing the criticality of stalling conditions. Third, stalling of a car with automatic transmission frequently does not occur until the driver is ready to accelerate, so that just at this most inconvenient time it is necessary to shift the car to neutral, restart the engine, and shift back into gear; magnifying the inconvenience of frequent stalls. A fourth factor affecting the magnitude of stalling difficulties relates to the volatility of the fuels now provided for automotive use. The volatility of commercial fuels over a period of years has been increased sufficiently to increase stalling difficulties as will be brought out herein.

On investigating this problem, it has been determined that the cause of repeated engine stalling in cool, humid weather is the formation of ice in the carburetor of the engine. On a cool, moist day, gasoline evaporating in the carburetor exerts sufficient refrigerating effect to condense and freeze moisture present in the air entering the carburetor. Normal fuel vaporization within the carburetor can cause a temperature reduction of the metal parts of the carburetor up to 50° F. below that of the entering air. Consequently, prior to the time of complete engine and radiator warm-up, this drop in temperature may cause formation of ice in the carburetor. Ice formation probably occurs most readily under conditions of light load operation. The result is that after a period of light load operation, when the throttle is closed to the idle position, ice already formed on the throttle plate and adjacent walls, plus ice which then forms, restricts the narrow air openings to cause engine stalling.

To define more clearly the problem of engine stalling due to carburetor icing, data were tabulated based on customer reaction surveys, carefully controlled road tests, and laboratory cold room engine performance tests. These tests show that carburetor icing depends primarily upon atmospheric temperature and humidity conditions. The tests show that stalling difficulties due to ice formation in the carburetor are not encountered below about 30° F., nor above 60° F. when employing fuels having conventional volatility characteristics. Similarly, these tests demonstrate that stalling is only encountered when the humidity is in excess of about 65%.

Another factor having a bearing on the formation of ice in the carburetor, is the volatility of the fuel employed. To determine this effect, laboratory cold room tests were conducted to evaluate the stalling characteris-

TABLE I

| | Number of Complaints of Two Stalls or More (Per 100 Cars) | | | | |
|---|---|---|---|---|---|
| Temperature, ° F | 32 | 35 | 37 | 52 | 56. |
| Relative Humidity, Percent | 52 | 70 | 96 | 100 | 96. |
| Weather | Clear | Overcast | Light Rain | Heavy Rain | Rain. |
| Winter Regular Users | 5 | 15 | 20 | 21 | 7. |
| Winter Premium Users | 6 | 38 | 40 | 42 | 2. | tics during warm-up of a number of fuels varying in volatility. In these tests a 1947 Chrysler car was installed in a room equipped with temperatures and humidity controls. While the temperature and humidity were maintained at particular levels, the stalling characteristics of the car were determined during the warm-up period. The procedure employed was to start the car and then immediately to raise the engine speed to 1500 R. P. M. This speed was maintained for 30 seconds, after which the engine was allowed to idle for 15 seconds. If the engine stalled before 15 seconds had expired, the car was again started and the speed immediately raised to 1500 R. P. M. for 30 seconds; while if stalling did not occur, the speed was increased to 1500 R. P. M. after the 15 second idling time. The alternate cycles of 30 seconds at 1500 R. P. M. followed by 15 seconds at idling were repeated until the engine was completely warmed up. The number of stalls encountered during this procedure, and up to the time of complete engine warm-up were then recorded. Tests were conducted at 40° F. and at a relative humidity of 100% employing three fuels of varying volatilities. The most volatile fuel was a premium grade of commercial gasoline having a 10% ASTM distillation point of 110° F., a 50% point of 190° F., and a 90% point of 294° F. by ASTM Method D-86. It was found that this fuel resulted in about 14 or 15 stalls during warm-up. A medium volatility fuel was also tested, consisting of a regular grade commercial gasoline having ASTM D-86 distillation characteristics such that 10% distilled at 121° F., 50% distilled at 220° F., and 90% distilled at 342° F. The number of stalls encountered with this fuel were 11. Finally, a low volatility gasoline was subjected to the same test procedure. The gasoline had ASTM distillation 10, 50, and 90% points at 126° F., 270° F. and 387° F. respectively. It was found that 5 stalls were encountered with this fuel.

As indicated by these data, carburetor icing is related to the volatility of the fuel employed. Thus, the least volatile fuel tested above, having a 50% distillation point of 270°, only resulted in 5 stalls, while the highest volatility fuel, having a 50% distillation point of 190° F., resulted in 15 stalls. Extrapolating these data as to the volatility of the fuel, it appears that a fuel having a volatility such that the ASTM 50% distillation point is 310° F., or higher would not be subject to stalling difficulties during warm-up. It must be appreciated, however, that a fuel having ASTM distillation characteristics of this nature would not be desirable as regards starting, warm-up time, cold engine acceleration, fuel economy and crankcase oil dilution in an automobile. However, in appreciating the scope of the present invention, it is important to note that this invention has particular application to gasoline fuels having an ASTM 50% distillation point below about 310° F. At the same time, as will be brought out, it is possible to correlate the quantity of additives required to overcome icing problems with the volatility of the fuel to be improved. In other words, smaller proportions of additives may be employed with fuels of relatively low volatility, while higher proportions of additives may be required with fuels of higher volatility. Also, it should be appreciated that even when complete stalling does not occur there may be a marked loss of power output due to icing. This is particularly serious in the case of aviation engines. For example, 30% of the light plane mishaps occurring in the United States in 1947 and 1948 were attributed to the formation of ice in the carburetor or intake manifold, which reduced power output by restricting the flow of combustible mixture to the cylinders.

It has now been discovered that distinct operating advantages are secured with respect to stalling, providing a relatively small critical amount of aliphatic diol containing from 6 to 21 carbon atoms in the molecule be utilized in the motor fuel. It is to be noted that the molecular weights of aliphatic diols of 6 to 21 carbon atoms may range from 116 to nearly 400. Aliphatic diols of molecular weight below 100 have not been found practically useful for the compositions of the present invention. The mechanism whereby the fuel compositions of the present invention prevent engine-stalling under icing conditions of the carburetor is not understood; but it is obviously not a simple anti-freeze effect or lowering of the freezing point of water according to Raoult's law in physics, since the aliphtic diols of lowest molecular weight are not the most effective for anti-stalling as they are for anti-freeze.

Specific desirable compounds for use in accordance with the present invention are:

2-methyl-pentane-diol-2,4
6-methyl-4,7-di-oxa-decane-diol-2,9
Hexane-diol-2,5
4-oxa-heptane-diol-2,6
6,9,12-trimethyl-4,7,10,13 - tetra - oxa - hexadecane - diol-2,15
4-methyl-2-oxa-4,6-dimethylol-heptane and the equilibrium mixture of tautomerism between
2-methyl-2-hydroxy-pentanone-4 and
2-methyl-3-pentene-diol-2,4

The amount of aliphatic diol employed should be in the range from about 0.1 to about 1% by volume based upon the volume of gasoline present. The preferred concentration is in the range from about 0.2 to 0.5%, especially in the range from about 0.3 to 0.5% by volume.

The present invention may be more fully understood by the following examples illustrating the same. In the test a motor fuel of the type of premium grade motor gasoline was used. Such gasoline normally contains "Ethyl Fluid" corresponding to between 1 and 3 cc. of tetra-ethyl-lead per gallon of gasoline and normally has at least 80 octane number. A gasoline having an initial boiling point of about 100° F., a final boiling point of about 350° F., about 20% distilled at 158° F., about 60% distilled at 212° F. and about 90% distilled at 302° F. by ASTM Method D-86, was mixed with various percentages of various addition agents and the icing characteristics of the fuel determined. The fuel was carbureted by air saturated with water at about 40° F., employing an air-fuel ratio of about 12/1 by weight. The minutes of elapsed time prior to the first indication of ice formation on the carburetor throttle plate was noted. The results of these operations are as follows:

*Example I*

Saturated solutions of three diols that were soluble only to the extent of less than 0.1 per cent by weight, were prepared with the original gasoline, which, without any diol added, allowed or caused ice-formation within 0.6 minute of testing. The results of corresponding tests on the solutions were as shown below:

| Diol Tested In Saturated Sol'n. in Gasoline | Diol C-Atoms | Diol Mol. Wt. | Min. Elapsed To First Indication of Ice Formation |
|---|---|---|---|
| No. 1. Ethane-diol-1,2 | 2 | 62 | 0.6 |
| No. 2. 3-Oxa-pentane-diol-1,5 | 4 | 106 | 0.6 |
| No. 3. 3,6-Di-oxa-octane-diol-1,8 | 6 | 150 | 0.6 |

None of the above diols was effective irrespective of molecular weight, nor particularly soluble irrespective of number of carbon atoms.

*Example II*

Using an original gasoline, which required an elapsed time of 0.6 minute for initial formation of ice in the standardized test procedure, solutions of 0.5 per cent by weight of some diols of greater solubility than those in Example I, were tested by the same procedure with results as shown below:

| Diol Tested In 0.5% Sol'n. in Gasoline | Diol C-Atoms | Diol Mol. Wt. | Min. Elapsed To First Indication of Ice Formation |
|---|---|---|---|
| No. 4. Propane-diol-1,2 | 3 | 66 | 1.2 |
| No. 5. Butane-diol-1,3 | 4 | 90 | 1.1 |
| No. 6. Pentane-diol-1,5 | 5 | 104 | 1.0 |
| No. 7. 1,3-dimethyl-butane-diol-2,3 | 6 | 118 | 0.6 |
| No. 8. 2-methyl-pentane-diol-1,3 | 6 | 118 | 2.3 |
| No. 9. 3-methylol-4-hydroxy-heptane | 8 | 146 | 0.6 |
| No. 10. 3-oxa-5-methyl-5,7-dimethylol-octane | 10 | 188 | 2.0 |

The results of the tests indicate that substantial effectiveness, as measured by elapsed time of at least two minutes, is obtained when the diol has a molecular weight about 118 M. W. and the two functional groups, methylol or hydroxyl, are not on adjacent carbon atoms, as in positions 2, 3 or 3, 4 in the molecule.

Example III

Tests were made in the same way as in Example II using an original gasoline, which required an elapsed time of 0.6 minute for initial ice formation and in which solutions of 0.5 per cent by weight of each of two, bifunctional aliphatic, oxygen-containing compounds were prepared. The test results are shown below:

| Bifunctional Compound Tested | No. of C-Atoms | Mol. Wt. | Min. Elapsed To First Indication of Ice Formation |
|---|---|---|---|
| No. 11. 2-methyl-2-hydroxy-pentanone-4 ⇌ 2-methyl-pentene-3-diol-2,4 | 6 | 116 | 3.5 |
| No. 12. 2-hydroxy-butanal-4 | 4 | 88 | 1.4 |

Of the above solutions, only one was prepared from a compound capable of keto-enol tautomerism. It was much more effective than the other and in a test at only 0.1 per cent concentration it was effective in delaying ice formation for 1.2 minutes.

Example IV

Tests were made in the same way as in Example II using an original gasoline, which required an elapsed time of 0.6 minute for initial ice formation. In it solutions were made at 0.1 per cent and 0.5 per cent concentration by weight of several aliphatic diols having between 6 and 21 carbon atoms per molecule. The test results are shown below:

| Solutions in Gasoline at Two Concentrations | Mins. Elapsed to First Ice Formation | |
|---|---|---|
| | 0.1% | 0.5% |
| No. 13. 2-methyl-pentane-diol-2,4 | 1.4 | 6.8 |
| No. 14. 6-methyl-4,7-di-oxa-decane-diol-2,9 | 1.3 | 6.8 |
| No. 15. hexane-diol-2,5 | 1.1 | 5.7 |
| No. 16. 4-oxa-heptane-diol-2,6 | 1.1 | 5.5 |
| No. 17. 6,9,12,15,18-penta-methyl-4,7,10,13,16,19-hexa-oxa-docosane-diol-2,21 | 0.9 | 4.6 |
| No. 18. 2-oxa-4-methyl-4,6-di-methylol-heptane | | 3.4 |
| No. 19. 3,6,9-tri-oxa-hendecane-diol-1,11 | | 2.9 |

From the above it is apparent that 2-methyl-pentane-diol-2,4 is an extremely desirable agent to be added to gasoline to prevent carburetor-icing. It and hexane-diol-2,5 have only five and six carbon atoms respectively in their longest chains and are therefore relatively quite volatile. The relatively non-volatile aliphatic diols, like No. 14, No. 16, No. 17, No. 18 and No. 19 in Example IV, can be used also in motor fuels of lesser volatility than premium grade commercial gasoline. They can be used to some advantage in distillate fuels that are not normally carbureted, for instance in turbo-fuel and diesel fuel with mid-boiling points higher than 310° F. in ASTM distillation test D-86.

The chemical structures of particularly effective bifunctional, aliphatic, oxygen-containing compounds to be added to gasoline in accordance with the present invention are:

| No. | Skeletal Structure | Relative Effect |
|---|---|---|
| 13 | C<br>C—C—C—C—C<br>    OH   OH | 6.8 |
| 14 | C<br>C—C—C—O—C—C—O—C—C—C<br>   OH                OH | 6.8 |
| 15 | C—C—C—C—C—C<br>    OH     OH | 5.7 |
| 16 | C—C—C—O—C—C—C<br>   OH        OH | 5.5 |
| 17 | C<br>C—C—C—O—(C—C—O—)₅C—C—C<br>   OH                     OH | 4.6 |
| 18 | C<br>C—O—C—C—C—C—C<br>        C   C<br>        OH OH | 3.4 |
| 11a | C<br>C—C—C=C—C<br>   OH  OH ⇅ | 3.5 |
| 11b | C<br>C—C—C—C—C<br>   OH   O | |

The general skeletal structure, neglecting the representation of hydrogen atoms, that are to be inserted as needed to satisfy the four valences of a carbon atom, has the following form:

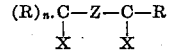

$$(R)_n \cdot C - Z - C - R$$
$$\quad\quad\; X \quad\quad\; X$$

wherein C is a carbon atom, R is a methyl or methoxy-methylene group, n is 1 or 2, Z is an aliphatic or oxa-aliphatic group, at least $CH_2$ and X is a functional group, either methylol or hydroxyl and in the latter case it may undergo keto-enol tautomerism.

To summarize, the composition of the present invention is a motor fuel of the type of gasoline to which has been added a small but critical concentration, not exceeding one per cent by weight, of a bifunctional, aliphatic, saturated or unsaturated, oxygen-containing compound, and more particularly of a diol, characterized by having the two functional groups, which may be methylol or hydroxyl, attached to two non-adjacent carbon atoms, which are removed from the ends of the longest aliphatic chain in the molecule by a methyl or methoxy-methylene radical, that is to say, by not more than two carbon atoms, and which are attached to secondary or tertiary carbon atoms in the longest chain.

In general, the longest aliphatic chain in the molecule of a bifunctional compound suitable for use in accordance with the present invention is substantially straight and preferably very slightly branched. It is understood that the term aliphatic is synonymous with acyclic and embraces open-chain oxygen-containing compounds, as well as those containing only carbon and hydrogen. Compound No. 17 had only five carbon atoms in methyl radicals as side branches and it had a total of twenty-one carbon atoms; so that seventy-six per cent of its component carbon atoms were in its longest aliphatic chain, which was the most highly branched among the compounds listed in Example IV. However, a compound having two-thirds of its carbon atoms, exclusive of any in methylol functional groups, in its longest aliphatic chain is considered to be only slightly branched. Compounds like No. 14, No. 16 and No. 17 may result from the hydrolytic condensation of two to seven or more molecules of propene-oxide. Compounds like No. 19 may be prepared similarly from ethylene-oxide and are generally less desirable for the purpose of the present invention.

In the compositions tested in Examples I to IV, the motor gasoline also contained between 0.50 and 0.75 per cent by volume of a solvent oil as defined in U. S. Patent 2,066,234. Solvent oil when used alone in that range of concentrations does not significantly alter the anti-stalling characteristics of a motor gasoline; but when used together with anti-stalling addition agents it sometimes exerts a very significant adjuvant effect in retarding ice formation or accumulation, for periods exceeding three minutes. The use of solvent oil is particularly beneficial in conjunction with the addition agents of the present invention when they are used in concentration as high as one per cent. Higher concentrations are unsuitable because the low volatility of the addition agents contributes to the tendency for formation of undesirable gummy residues when the gasoline is evaporated in a carburetor or intake manifold of an engine.

Having described the invention, it is claimed:

1. An anti-stalling motor gasoline containing between 0.1 and 1% by volume of an aliphatic branched chain bi-functional compound consisting of carbon, hydrogen and oxygen and having from 6–21 carbon atoms in its molecule, at least two-thirds of said carbon atoms being in the longest chain in said molecule, said longest chain being selected from the group consisting of aliphatic and oxa-aliphatic groups, two non-adjacent functional groups attached to non-terminal carbon atoms within said longest chain, each of said functional groups being removed by not more than two carbon atoms from the ends of said longest chain, said functional groups being selected from the class consisting of methylol and hydroxyl radicals.

2. A gasoline as defined in claim 1 which contains between 0.3 and 0.5% by volume of the bi-functional compounds.

3. A gasoline as defined in claim 2 in which the bi-functional compound is a saturated aliphatic compound.

4. A gasoline as defined in claim 2 in which the bi-functional compound is an unsaturated aliphatic compound.

5. A gasoline as defined in claim 2 in which the two carbon atoms to which the functional groups are attached are separated by at least 1 carbon atom.

6. A gasoline as defined in claim 2 in which the two carbon atoms to which the functional groups are attached are separated by at least one oxy-alkylene group.

7. A gasoline as defined in claim 2 in which the bi-functional compound is an aliphatic diol.

8. A gasoline as defined in claim 7 in which one of the hydroxyl radicals is attached to a tertiary carbon atom.

9. A gasoline as defined in claim 7 in which one of the hydroxyl radicals is attached to an unsaturated carbon atom.

10. A gasoline as defined in claim 8 in which the bi-functional compound is 2-methyl-pentane-diol-2,4.

11. A gasoline as defined in claim 7 in which the bi-functional compound is 6-methyl-4,7-di-oxa-decane-diol-2,9.

12. A gasoline as defined in claim 9 in which the bi-functional compound is 2-methyl-3-pentene-diol-2,4.

References Cited in the file of this patent

UNITED STATES PATENTS 2,315,957  Hewlett _____ Apr. 6, 1943